T. BROWN.
MANURE SPREADER.
APPLICATION FILED DEC. 29, 1911.
1,139,482.
Patented May 18, 1915.
4 SHEETS—SHEET 1.
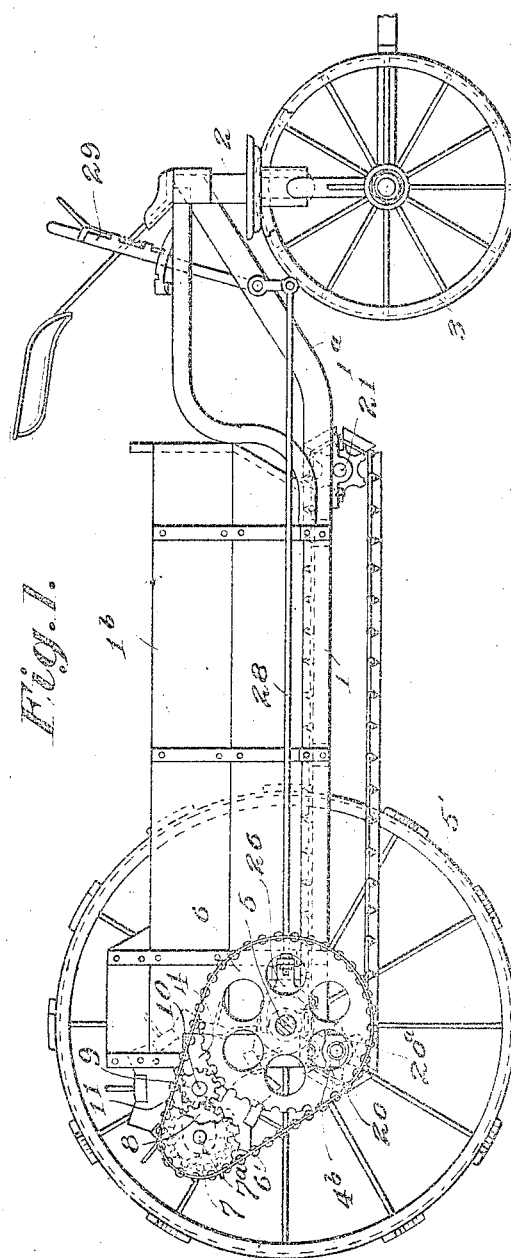
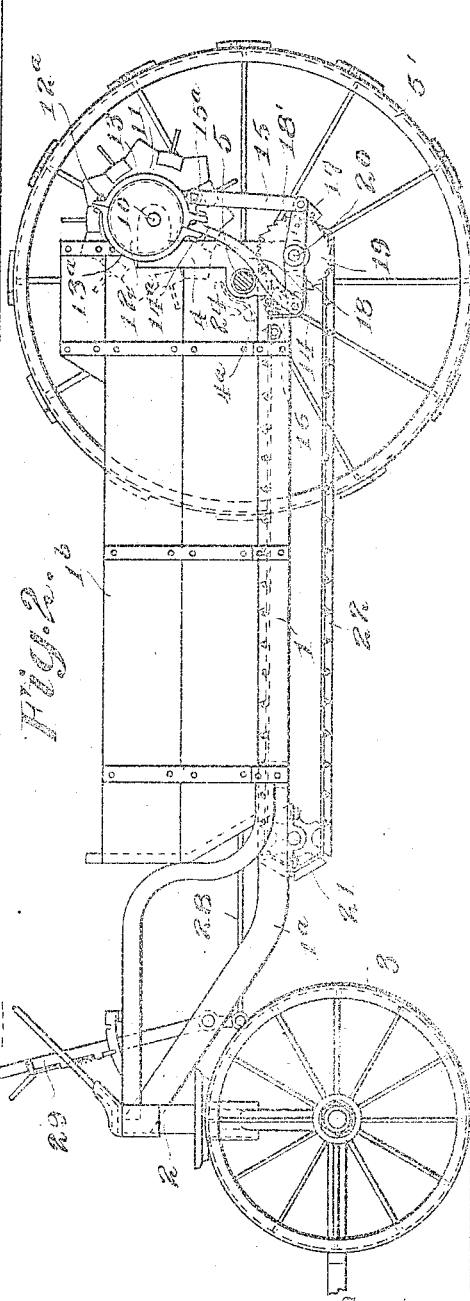

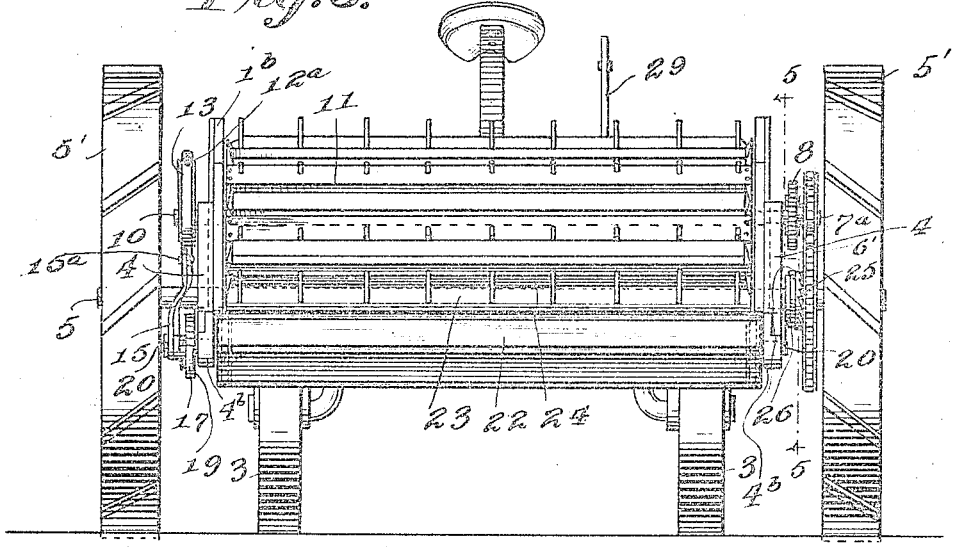

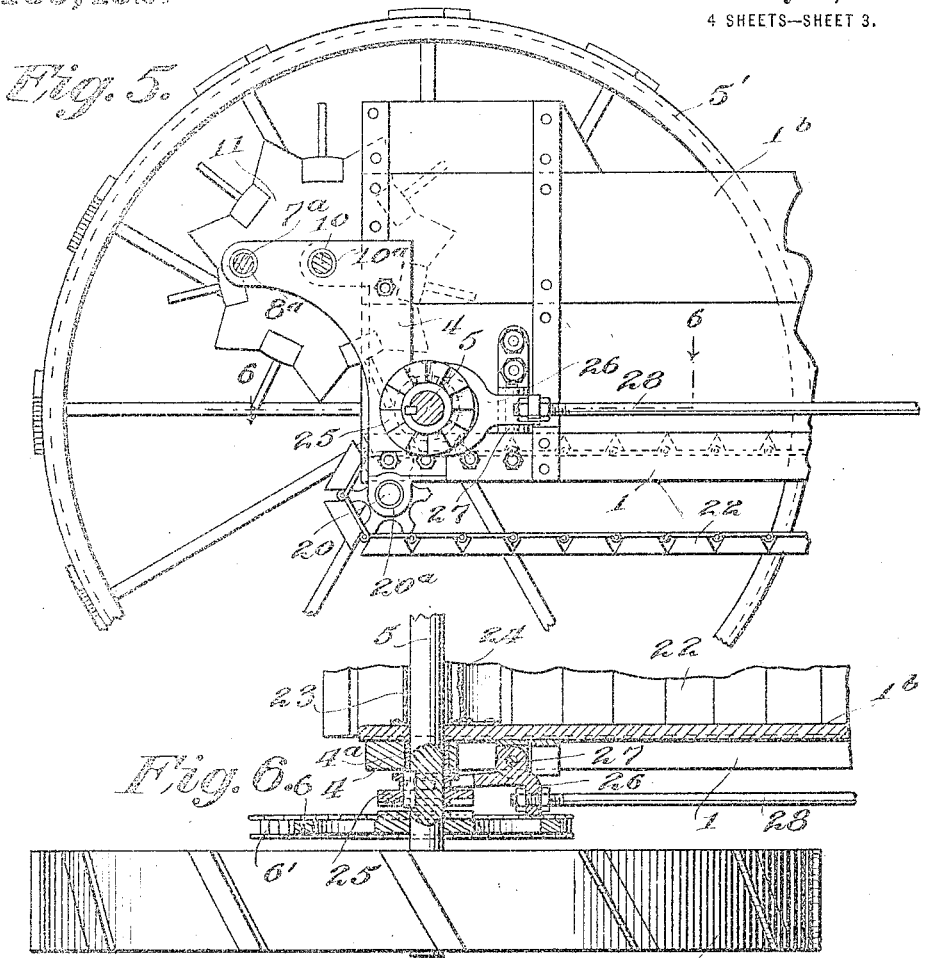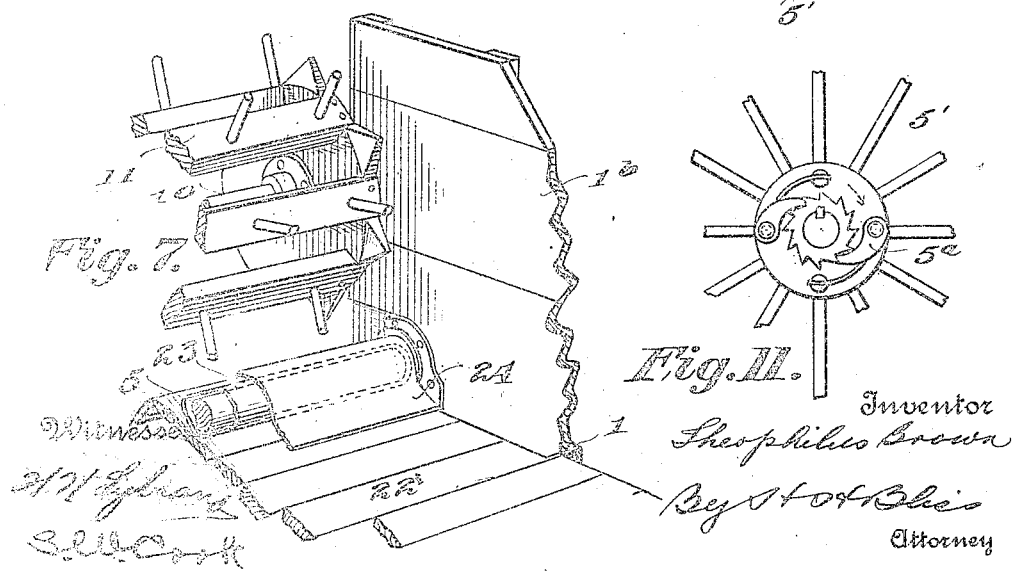

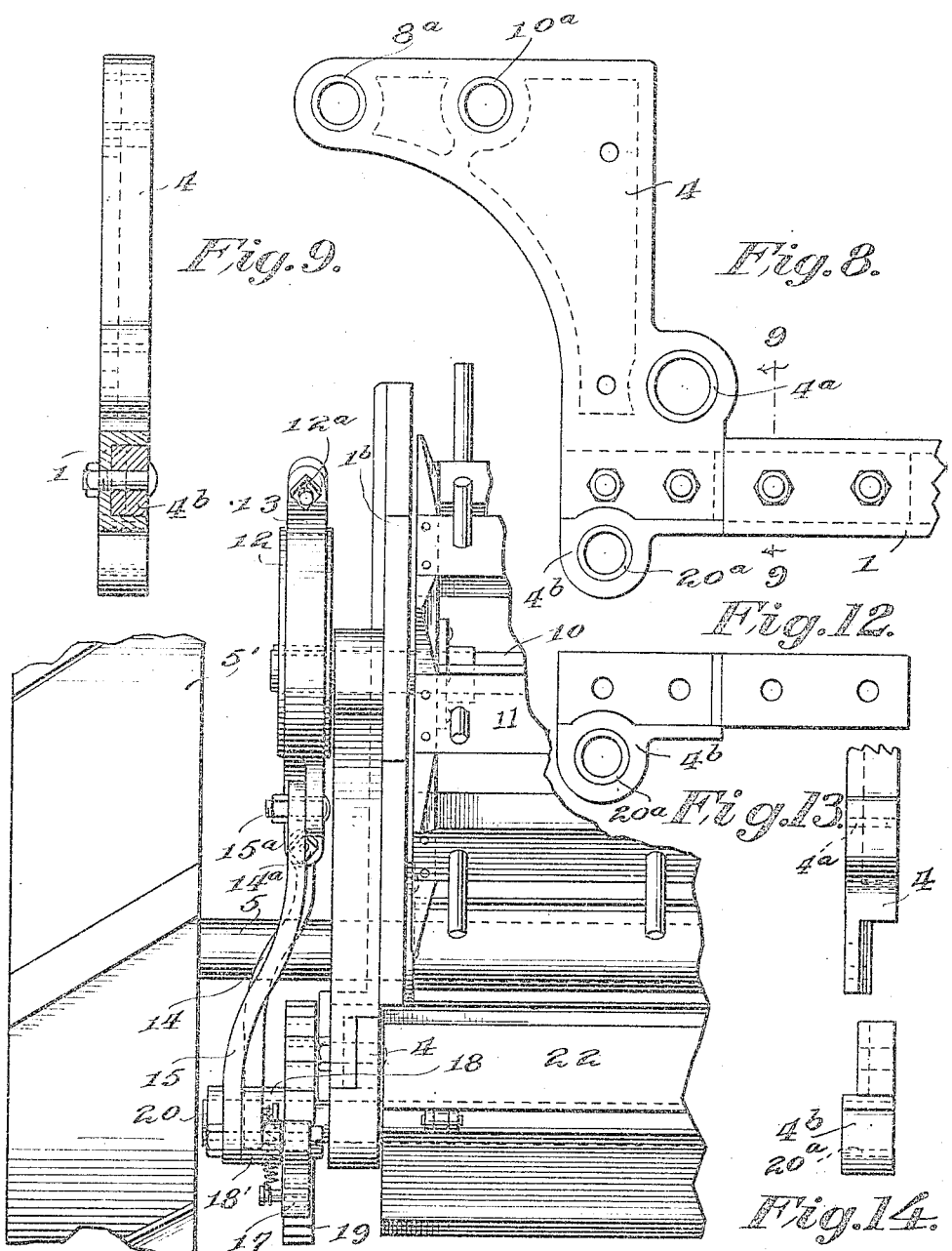

UNITED STATES PATENT OFFICE.

THEOPHILUS BROWN, OF MOLINE, ILLINOIS, ASSIGNOR TO MARSEILLES COMPANY, A CORPORATION OF ILLINOIS.

MANURE-SPREADER.

1,139,482.  Specification of Letters Patent.  Patented May 18, 1915.

Application filed December 29, 1911. Serial No. 668,503.

*To all whom it may concern:*

Be it known that I, THEOPHILUS BROWN, a citizen of the United States, residing at Moline, in the county of Rock Island and State of Illinois, have invented certain new and useful Improvements in Manure-Spreaders, of which the following is a specification, reference being had therein to the accompanying drawing.

This invention relates to improvements in manure distributers of that class of structures in which each is formed of a forward element and a rear element, the forward element including the front truck and the body part which holds the material to be distributed and is provided with means for supporting the load and feeding it backward, and the rear element including the rear ground wheels, connected by a through axle, and a rotary distributing mechanism or beater which shreds or tears particles from the rear end of the backward moving load mass and raises them and throws them rearward to the ground.

In the drawings, Figure 1 is a side elevation of a manure distributer with a rear wheel removed to show the feeder driving mechanism. Fig. 2 is an elevation of the side opposite that shown in Fig. 1, the rear wheel being removed to show the apron driving mechanism. Fig. 3 is a rear elevation. Fig. 4 is a fragmentary side elevation with one ground wheel removed to show the apron driving mechanism and its connections with the beater shaft. Fig. 5 is a vertical sectional view on the line 5—5 of Fig. 3. Fig. 6 is a horizontal sectional view on the line 6—6 of Fig. 5. Fig. 7 is a fragmentary perspective view from the inside of the body showing an end of the beater and axle. Fig. 8 is a side elevation of one of the main supporting brackets 4, and of a supplemental sill attaching bracket. Fig. 9 is a vertical sectional view on the line 9—9 of Fig. 8. Fig. 10 is an enlarged fragmentary end elevation showing the apron driving mechanism. Fig. 11 is a fragmentary side elevation of the ratchet connection between one of the rear ground wheels and the rear axle. Figs. 12, 13 and 14 show details of the brackets.

The machine comprises the body part, the front truck element, and the rear wheel and reel-supporting-and-driving devices, at the rear end of the structure. In many respects the body part and other parts can be constructed in any of the now well known ways.

In the drawings the frame of the body is shown as having sills 1, which extend from the rear ground wheels forward along the bottom of the body to the front end, and are then turned upward as at 1ª. At the front upper ends they are united to the front truck frame having one or more uprights as at 2. Upon this front truck frame are mounted the front wheels 3 in any suitable manner. The side sills 1 are connected by transverse bars at suitable points. At the rear end of the vehicle there are brackets 4, which are connected to the rear ends of the side sills 1 and carry bearings 4ª in which the rear axle 5 is mounted. The body structure, comprising the sills 1, and the vertical sides 1ᵇ, is secured by brackets 4ᵇ to the rear frame element (comprising the brackets 4, the axle connections etc.) and can be detached therefrom, the machine as an entirety being such that it can be regarded as made up of the body structure and the front truck, on one hand, and the rear wheels with their axle, the beater, the beater support and connecting devices, on the other hand. The axle 5 carries at its outer ends the rear ground wheels 5'. These are loose thereon and may be provided with ratchets 5ª of a suitable form so as to be capable of independent rotation.

The two principal driven parts, that is, parts which have motion independently of the motion of the vehicle as an entirety, are the beater and the feeding apron at the bottom of the vehicle. The beater 11 is secured to the shaft 10, which latter is mounted in bearings 10ª carried by the uprights or brackets 4 above described. This beater is driven from the axle by means of the sprocket wheel 6, the chain 6', the sprocket wheel 7, the spur wheel 8 and the spur pinion 9, rigidly secured to the shaft 10 of the beater. The sprocket wheel 7 and spur wheel 8 are rigidly fastened together, or formed integral, and rotate upon a stud shaft 7ª secured within a bushing 8ª in the upper portion of the bracket 4 located at the beater driving side of the mechanism.

The mechanism for driving the feeding apron extends from the end of the shaft 10 to the spider shaft 20 upon which the rear end of the apron is mounted. An eccentric 12 is secured upon the end of the shaft 10 and rotates within an eccentric strap comprising the two halves 13 and 13ª. The upper connection between the two halves of the eccentric strap is made by a bolt 12ª, while the lower connection is made by a bolt 14ª which also serves to connect a pitman 14 to the eccentric strap. 15 is a second pitman pivotally connected at 15ª to the strap. These pitmen 14 and 15 are at their lower ends respectively pivotally connected to radius arms 18 and 18' which are mounted upon the shaft 20 at the rear end of the apron. Each pitman is provided with a ratchet dog, one shown at 16 and the other at 17. These dogs are moved in the vertical planes of the ratchet wheel 19 and impart thereto a step-by-step motion. In this connection it is to be noted that modifications may be made as desired. For example, use may be made of devices for varying the effective throw of the ratchets, such as are shown in my application, Serial No. 620,145, filed April 10th, 1911. The ratchet wheel 19 may be connected directly to the apron shaft 20 or with it may be combined devices, such as shown in my aforesaid application, for preventing the movement of the apron independently of the feeding movements of the ratchet dogs. The shaft 20 is carried in bearings 20ª and the lower end of the brackets 4. The brackets 4 carrying the axle, the beater shaft and the intermediate driving devices and the sill-brackets 4ᵇ connected to the side walls of the body and carrying the rear apron sprocket shaft when united provide a rigid unitary structure. By removing the bolts connecting the brackets 4 to the sill-brackets 4ᵇ and the bolts securing the upright sides of the body to the bracket 4, the entire rear structure comprising the axle and the distributing mechanism may be disconnected from the body.

The apron is indicated, as an entirety, by 22. At its forward end it is supported upon a shaft 21. The devices which support the apron between the shafts 20 and 21 may be of any suitable sort.

It will be seen that I employ a "through" axle; that is to say, an axle extending from side to side of the body and directly across the space between the side walls which latter confine the load. The axle serves as a powerful bracing device for binding together the side parts of the vehicle at the rear end and gives them a firm support. It is well known to the makers and the users of these machines that the stresses and strains exerted upon the rear end of the vehicle body are very severe and rapidly cause the weakening and breakage of the lighter parts and the destruction of the mechanism as a whole. In the Patent No. 986,903 issued to me on the 14th day of March 1911, I provide a similar bracing for the rear end of the vehicle body by means of the axle. But as the axle in the earlier structure was in a horizontal plane elevated considerably above the top surface of the feeding apron it was positioned in the lines of travel of the middle or upper part of the load mass, and this, when moving backward, would impinge upon and crowd against the axle. But in that earlier structure this difficulty was overcome by placing the beater directly on the axle so that the material was picked up from the load before it moved back as far as the axle and carried over the top of the load and thrown backward to the ground. And, in turn, this placing of the beater on the axle was accompanied by the lowering of the feeding apron to planes relatively near the ground. When a low down machine was desired, a superior structure was provided. But in many cases it is desirable to have the apron in higher planes and yet retain the great advantages incident to having a straight axle carried across the vehicle at the lines where severe strains and work are experienced.

In the present construction it will be seen from the drawings that the feeding apron is brought up away from the ground and has its upper, operative surface placed close to the under side of the axle. The beater, in turn, is elevated so as to be positioned on lines above those of the axle, and preferably somewhat behind the vertical transverse plane thereof. The brackets 4 resting directly on the axle, support the beater in such way that the violent work which it performs and the strains which it exerts are not transmitted to the body but are taken by the brackets, the axle and the ground wheels. In other words, the support and abutment for the beater is virtually the ground surface, the forward part of the mechanism being relieved and also the lighter parts of the sides and the frame at the rear end.

To guard against any of the load material being wrapped around or crowded under the axle, shields or guards are provided. Thus a tube such as indicated at 23 can be carried around more or less of the axle. Or in place of said tube, or supplemental thereto, use may be made of an inclined guide such as shown at 24.

The axis of the beater being somewhat behind the transverse vertical plane of the axis of the axle it is situated in such way that excellent results are secured in respect to the beater fingers engaging with and picking up the bottom part of the material, for as the bottom part of the load is at its rear end slightly turned upward by the guide or shield as it (the load) is propelled backward by the apron, said bottom part is exposed so that the fingers can come under it and readily lift and tear the mass into shreds for backward delivery.

It will be understood that the above described driving connections between the axle and beater may be of any well known or desired form, and also that any suitable mechanism for intermittently connecting the axle to the prime driver (such as the sprocket wheel 6) can be used. As shown, there is a clutch indicated at 25 which is splined to the axle and adapted to be engaged with or disengaged from the sprocket wheel 6. The shipping element of the clutch, such as a lever 26, pivoted at 27 to a bracket or carrier held by the vehicle body, can be moved in one direction or the other by a pull and thrust rod 28 extending to the front part of the machine where it is connected to the lever mechanism 29 by which the operator throws into and out of action the reel and feeding mechanism. These parts also can be of any well known form or any form that is suitable for accomplishing the desired purposes.

The axle being interposed between, or arranged intermediately of, the apron and the distributer, and situated closely to both, (it being approximately tangential at its lower part to the apron, and somewhat in advance of the points where the distributer engages with the material) the result is that the load is, as it were, partially arrested, and permitted to be carried upward and backward over the top of the axle, so that the fingers or operative parts of the distributer are permitted to secure an advantageous hold upon the rear end parts of the load, and particularly on the bottom parts at the rear end. This arrangement of parts is to be contradistinguished from that found in earlier machines where the load is carried on unbroken lines by the main apron directly to the beater, with the expectation that the fingers of the latter will engage with all of the particles of the load at the rear end of the apron. Experience shows that much of the material is apt to travel quickly over the rear end of the apron if it is brought to the distributer without means being present which, while slightly checking it, will permit it to pass over the axle, and to the distributer.

In the present construction the path of the material, as an entirety, is made up of two portions, one of which is in low planes near the ground, and the other of which is at at angle to the former, the material passing over the axle while traveling along the second portion of the path.

What I claim is:

1. In a fertilizer distributer, the combination of the body structure, the rear ground wheels, the through axle extending from one ground wheel to the other, the distributer mounted on an axis remote from the axle and having its outermost parts arranged to move close to the axle, the movable bottom in the body structure arranged to have its uppermost moving parts travel in a horizontal plane approximately tangential to the lower surface of the axle, said axle and movable bottom being arranged and related substantially as set forth whereby they are adapted to have the material which is moved backward by the bottom taken upward over the axle and relatively to the beater, and means for causing said material to move upward over the axle.

2. In a fertilizer distributer, the combination of the body structure, the rear ground wheels, the through axle extending from one ground wheel to the other, the distributer mounted on an axis above the axis of the axle and having its operative parts intersect lines below the plane of the last said axis, the movable bottom in the body structure arranged to have its uppermost moving parts travel in a horizontal plane approximately tangential to the lower surface of the axle, said axle and movable bottom being arranged substantially as set forth whereby they are adapted to permit the material moved backward by the bottom to be taken over the axle and downward to the distributer, and means for causing the material to move over the axle as aforesaid, substantially as set forth.

3. In a fertilizer distributer, the combination of the body structure, the rear ground wheels, the through axle extending from one ground wheel to the other, and having its longitudinal central part lying in the horizontal planes of the load mass contained within the body, the distributer mounted on an axis above the axle, and the movable bottom in the body structure for supporting the load mass and causing it to move backward and over the axle to the distributer, substantially as set forth.

4. In a fertilizer distributer, the combination of the body structure, the rear ground wheels, the through axle extending from one ground wheel to the other, the distributer mounted on an axis above and behind the axle, and the movable bottom in the body structure adapted to feed the load mass backward in the horizontal planes of the axle, substantially as set forth.

5. In a fertilizer distributer, the combination of the body structure, the apron at the bottom thereof to support the material and feed it backward, the rear ground wheels, the rotary distributer arranged to engage with the end parts of the backward moving load mass, the through axle extending from one ground wheel to the other and arranged above the apron and intermediately of the apron and distributer, said parts being arranged substantially as set forth whereby the material moved backward by the apron is permitted to be carried over the axle and to be engaged by the distributer at points near the axle and behind the vertical plane of its axis and means for causing the material to move upward over the axle.

6. In a fertilizer distributer, the combination of the body structure, the movable bottom therein for supporting the material and feeding it backward, the rear ground wheels, the through axle extending from one of said ground wheels to the other and having its longitudinal central part lying in the horizontal planes of the bottom part of the load mass, and the distributer mounted on an axis above the axle and arranged to have its operative parts rotate across the horizontal planes of the axle and across the horizontal planes of the upper part of the load mass, substantially as set forth.

7. In a fertilizer distributer, the combination of the body structure, the movable bottom therein for supporting the material and feeding it backward, the rear ground wheels, the through axle extending from one of said ground wheels to the other and having its longitudinal central part lying in the horizontal planes of the bottom part of the load mass, and the distributer on an axis above the axle and arranged to rotate across the horizontal planes of the top part of the load mass, substantially as set forth.

8. In a fertilizer distributer, the combination of the body structure, the movable bottom in said body for supporting the material and moving it backward, the rear ground wheels, the through axle extending from one ground wheel to the other and situated above the movable bottom, and the distributer mounted on an axis above the axle and having its outermost operative parts arranged to rotate in lines outside of the axle and to engage with the rear end parts of the load mass and lift and carry them backward, substantially as set forth.

9. In a fertilizer distributer, the combination of the body structure having a longitudinally movable bottom for supporting and feeding the material, the rear ground wheels, the rotary through axle extending from one ground wheel to the other and having its longitudinally central part situated immediately above the carrying apron, means for guiding the material of the load to points above the axle, and the distributer rotating in paths outside of the axle and arranged to engage with the rear end part of the mass and carry it upward away from the axle and deliver it backward to the ground, substantially as set forth.

10. In a fertilizer distributer, the combination of the body structure, the longitudinally movable bottom therein for supporting and feeding the material, the rear ground wheels, the through axle extending from one ground wheel to the other and situ- ated above the carrying apron and the rotary distributer on an axis above the through axle and means for guiding the material of the load on lines extending over the axle as said material is moved backward.

11. In a fertilizer distributer, the combination of the body structure, means for supporting and feeding the material backward in the vehicle, the rear ground wheels, the through axle passing across the vehicle from one ground wheel to the other and situated above the means for feeding the material backward, the rotary distributer rotating in lines above the axle and means supplemental to the distributer for passing the material of the load upward and over the axle toward the distributer.

12. In a fertilizer distributer, the combination of the body structure, the rear ground wheels, the through axle extending from one ground wheel to the other, the distributer having its outermost operative parts arranged to move close to the axle, the movable bottom in the body structure arranged to support the load mass and feed it backward toward the axle, and a chute or guide adapted to deflect the material over the axle toward the distributer, substantially as set forth.

13. In a fertilizer distributer, the combination of the body structure, the rear ground wheels, the through axle extending from one ground wheel to the other, the brackets resting upon the ground wheels independently of the body structure, the distributer mounted on the said brackets on an axis above the axle and the movable bottom in the body structure for supporting the load mass and feeding it backward over the axle to the distributer.

14. In a fertilizer distributer, the combination of a load carrying body, a through rear axle near the rear end of the body, a movable bottom suspended along a distance in front of the axle and having its top surface below the top of the axle, and a distributer above and at the rear of said axle.

15. In a fertilizer distributer, the combination of the load carrying body, the movable bottom therein for supporting the load and feeding it rearward, the through axle lying in the horizontal planes of the load mass, the rear ground wheels carried by the axle, the distributer mounted upon an axis remote from the axle, and means independent of the distributer for elevating the load mass over the said axle.

16. In a fertilizer distributer, the combination of the load carrying body structure, the movable bottom therein for supporting material and feeding it rearward, the side sills carrying the body structure, the through axle positioned above the said sills, the rotary distributer mounted on an axis remote from and at the rear of the axle, and means for guiding the material of the load on lines extending over the axle as said material is moved backward.

17. In a fertilizer distributer, the combination of the load carrying body, the movable bottom therein for supporting the load and feeding it rearward, the side sills supporting the load carrying body, the through axle positioned above and carried by the side sills, the rear ground wheels carried by the axle, the distributer mounted upon an axis remote from and at the rear of the axle, and means for elevating the load mass over the said axle.

18. In a fertilizer distributer, the combination of a vehicle body, a strengthening through axle near the rear end thereof, a load receiving chamber in the front part of the vehicle extending to horizontal planes below the top of the axle, a bottom support for the load arranged to provide a vertically broken path for the bottom surface parts of the load whereby the bottom part of the load first travels backward on lines intersecting the axle, and then on lines extending upward and over the axle, and a rotary distributer in the rear part of the vehicle.

19. In a fertilizer distributer, the combination of a vehicle body having a forward load receiving body with a relatively low load supporting bottom, a through axle arranged in horizontal planes as described, whereby the bottom part of the load first travels directly toward the axle, a load support in the vertical planes of the axle over which the load travels upward and backward from the aforesaid forward part of the load receptacle, and a rotary distributer in the rear of the vehicle.

20. In a fertilizer distributer, the combination of a vehicle having in its forward part a load receiving chamber with a relatively low load support, a through axle in horizontal planes above the horizontal planes of the bottom support in the front load receiving chamber and situated to have the load moving backward from the said front receiving chamber move on lines directly toward the axle, a rotary distributer in the rear part of the vehicle, and means supplemental to the distributer for causing the load to travel upward and backward around the axle and out of contact therewith.

21. In a fertilizer distributer, the combination of a vehicle with the load receiving chamber in its forward part, a rotary distributer in the rear end of the vehicle, means for vertically supporting the load and carrying it backward to the distributer along a broken path having a front portion where the load travels on lines relatively near the ground and a rear portion at an angle to the aforesaid portion along which rear portion of the path the load travels on lines higher than the axle as it approaches the distributer.

22. In a fertilizer distributer, the combination of a vehicle having a load receiving chamber, a distributer in the rear end of the vehicle, a through axle in front of the vertical plane of the distributer axis, and means for vertically supporting the load and guiding it to travel first on lines intersecting the axle, then on lines inclined upward thereto, and then backward to the beater.

23. In a fertilizer distributer, the combination of a vehicle with a front load carrying chamber, a through axle, a distributer near the rear part of the vehicle in a vertical plane behind that of the axis of the axle, means for vertically supporting and feeding backward the load, a feeding means carrying the load or a part thereof first on lines intersecting the axle and then on lines extending to points above the axle.

24. In a fertilizer distributer, the combination of a vehicle with a front load carrying chamber, a through axle, a distributer near the rear part of the vehicle, the feeding means for supporting the load in the front load carrying chamber and advancing it rearward in a relatively low plane to transverse lines near the axle, a feeding means extending upward from the first mentioned feeding means to carry the load up and across the axle, and means for preventing the load from coming in contact with the axle.

25. In a manure spreader, a rear axle, a body suspended therefrom, a bottom structure for said body, a portion of said bottom being supported in a plane below the axis of said rear axle and in front thereof, and a portion supported so as to overlie said rear axle, said bottom structure being, as an entirety, arranged to feed and guide the material backward and upward over the axle.

In testimony whereof I affix my signature, in presence of two witnesses.

THEOPHILUS BROWN.

Witnesses:
 FLOYD R. TODD,
 W. B. McFALIN.

It is hereby certified that in Letters Patent No. 1,139,482, granted May 18, 1915, upon the application of Theophilus Brown, of Moline, Illinois, for an improvement in "Manure-Spreaders," errors appear in the printed specification requiring correction as follows: Page 3, line 7, for the word "intermittently" read *intermittingly;* same page, line 31, after the word "load" insert the word *material;* same page, line 57, for the word "at", second occurrence, read *an;* same page, line 128, after the word "and" insert the article *the;* and that the said Letters Patent should be read with these corrections therein that the same may conform to the record of the case in the Patent Office.

Signed and sealed this 6th day of July, A. D., 1915.

[SEAL.]

R. F. WHITEHEAD,

*Acting Commissioner of Patents.*